(12) United States Patent
Lemarchand et al.

(10) Patent No.: US 8,566,498 B2
(45) Date of Patent: Oct. 22, 2013

(54) DOCKING STATION WITH NETWORK BASED PERSONALITY PROFILE

(75) Inventors: Romuald Francois Lemarchand, Cupertino, CA (US); Ian Cameron Smith, Oakland, CA (US)

(73) Assignee: Palm, Inc., Sunnyvale, CA (US)

( * ) Notice: Subject to any disclaimer, the term of this patent is extended or adjusted under 35 U.S.C. 154(b) by 338 days.

(21) Appl. No.: 12/872,813

(22) Filed: Aug. 31, 2010

(65) Prior Publication Data
US 2012/0054399 A1 Mar. 1, 2012

(51) Int. Cl.
*G06F 13/00* (2006.01)

(52) U.S. Cl.
USPC .......................................... 710/303; 710/304

(58) Field of Classification Search
USPC .................................................. 710/303, 304
See application file for complete search history.

(56) References Cited

U.S. PATENT DOCUMENTS

| | | | |
|---|---|---|---|
| 5,463,742 A | 10/1995 | Kobayashi | |
| 5,826,043 A | 10/1998 | Smith et al. | |
| 6,151,646 A | 11/2000 | Watts et al. | |
| 6,177,860 B1* | 1/2001 | Cromer et al. | 340/10.1 |
| 6,609,207 B1* | 8/2003 | Cromer et al. | 726/35 |
| 2002/0038394 A1* | 3/2002 | Liang et al. | 710/62 |
| 2002/0068991 A1* | 6/2002 | Fitzsimmons, Jr. | 700/214 |
| 2002/0086703 A1* | 7/2002 | Dimenstein et al. | 455/557 |
| 2002/0091796 A1 | 7/2002 | Higginson et al. | |
| 2002/0163780 A1* | 11/2002 | Christopher | 361/686 |
| 2002/0169866 A1* | 11/2002 | Lim et al. | 709/223 |
| 2003/0003899 A1* | 1/2003 | Tashiro et al. | 455/414 |
| 2003/0088880 A1* | 5/2003 | Martinez et al. | 725/133 |
| 2003/0172218 A1 | 9/2003 | Scott et al. | |
| 2004/0058641 A1* | 3/2004 | Acker | 455/3.02 |
| 2004/0148445 A1* | 7/2004 | Lee et al. | 710/72 |
| 2005/0172034 A1* | 8/2005 | Sakai et al. | 709/250 |
| 2006/0098666 A1 | 5/2006 | Francis Conde Powell | |
| 2006/0248252 A1* | 11/2006 | Kharwa | 710/303 |
| 2006/0279253 A1* | 12/2006 | Kawai | 320/114 |
| 2007/0016654 A1* | 1/2007 | Bowles et al. | 709/217 |
| 2007/0049342 A1* | 3/2007 | Mayer et al. | 455/558 |
| 2007/0083691 A1* | 4/2007 | Keely et al. | 710/303 |
| 2007/0097255 A1 | 5/2007 | Dalton et al. | |
| 2007/0101039 A1* | 5/2007 | Rutledge et al. | 710/303 |

(Continued)

FOREIGN PATENT DOCUMENTS

| | | | | |
|---|---|---|---|---|
| GB | 2445977 A | * | 7/2008 | G06F 1/16 |
| JP | 2004304720 A | * | 10/2004 | H04B 7/26 |
| WO | WO 2009012339 A2 | * | 1/2009 | G06F 13/10 |

OTHER PUBLICATIONS

Guangming Song; Hui Wang; Jun Zhang; Tianhua Meng, "Automatic docking system for recharging home surveillance robots," Consumer Electronics, IEEE Transactions on , vol. 57, No. 2, pp. 428,435, May 2011.*

(Continued)

*Primary Examiner* — Faisal M Zaman

(57) ABSTRACT

A network system and method are disclosed. The network system includes at least one docking station to which a portable electronic device is individually couplable. Each of the at least one docking station is configured to allow the portable electronic device to access a network to receive information corresponding to a personality profile associated with the respective one of the at least one docking station upon the portable electronic device being coupled to the respective one of the at least one docking station.

15 Claims, 4 Drawing Sheets

(56) References Cited

U.S. PATENT DOCUMENTS

| | | | |
|---|---|---|---|
| 2008/0167023 A1* | 7/2008 | Steimer et al. | 455/417 |
| 2008/0305737 A1* | 12/2008 | Childress et al. | 455/3.05 |
| 2009/0153687 A1* | 6/2009 | Mayuzumi | 348/211.3 |
| 2009/0163139 A1* | 6/2009 | Wright-Riley | 455/39 |
| 2009/0271534 A1* | 10/2009 | Acosta et al. | 710/16 |
| 2010/0251361 A1* | 9/2010 | Collopy et al. | 726/19 |
| 2011/0066861 A1* | 3/2011 | Klum et al. | 713/189 |
| 2011/0106954 A1* | 5/2011 | Chatterjee et al. | 709/227 |
| 2011/0191598 A1* | 8/2011 | Sim et al. | 713/193 |
| 2011/0230209 A1* | 9/2011 | Kilian | 455/456.3 |

OTHER PUBLICATIONS

Eichen, Elliot; Azim, R.; Chang, S.C.; Geiger, J.; Flynn, J.; Gaviria, R.; Goodman, L.; Javaregowda, G.; Mishra, P.; Perry, P., "Smartphone docking stations and strongly converged VoIP clients for fixed-mobile convergence," Wireless Communications and Networking Conference (WCNC), 2012 IEEE, pp. 3140,3144, Apr. 1-4, 2012.*

Babineau: "*The Top Droid Accessories*"; http://www.bukisa.com/articles/216334_great-accesories-as-gifts-for-the-droid; Dec. 19, 2009 pp. 1-3.

* cited by examiner

DOCKING STATION WITH NETWORK BASED PERSONALITY PROFILE

BACKGROUND

A variety of portable electronic devices, such as laptop computers and wireless communications devices, can be coupled to docking stations to provide electrical connection to peripheral devices, for charging the batteries of the portable electronic device, or to provide access to a network. The portable electronic device can operate both while coupled and uncoupled with the docking station. However, the docking station may allow additional functionality of the portable electronic device while coupled to the docking station.

DETAILED DESCRIPTION

Figure 1:
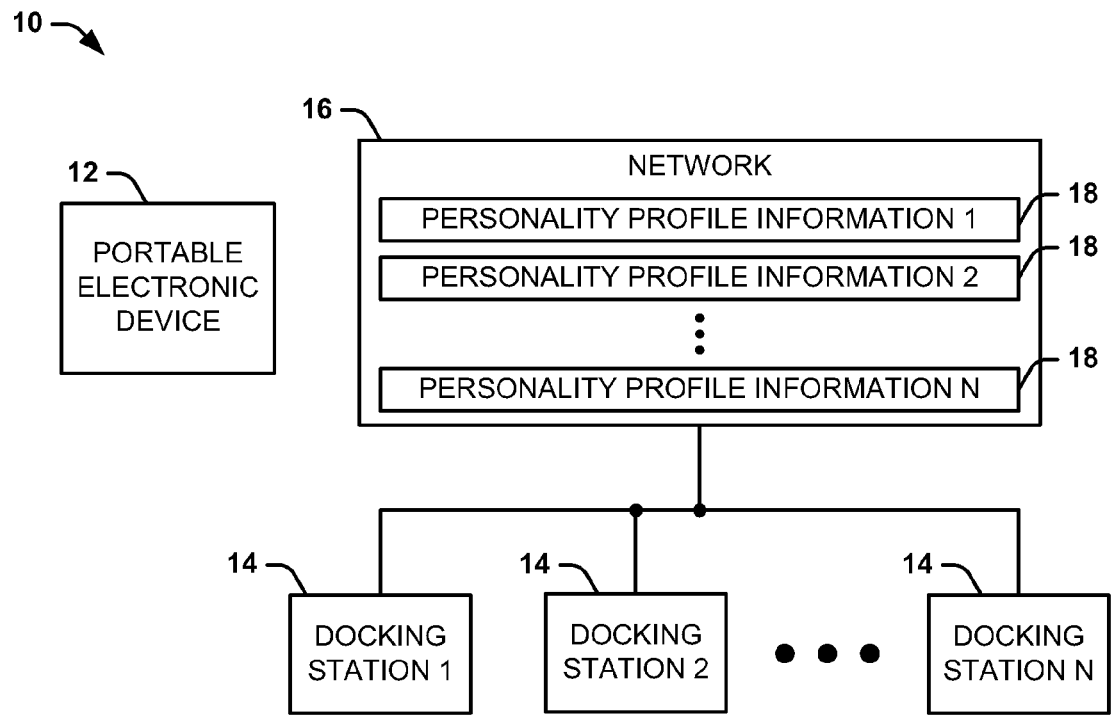
FIG. 1 illustrates an example embodiment of a network system.

FIG. 1 illustrates an example embodiment of a network system 10. As an example, the network system 10 can be implemented in a home, an office, and/or a combination thereof. The network system 10 includes a portable electronic device 12 and a plurality N of docking stations 14, where N is a positive integer. The portable electronic device 12 can be configured as a laptop computer or a wireless communication device, such as a cellular phone. In the example of FIG. 1, the docking stations 14 are each coupled to a network 16. As an example, the network 16 can be a local area network (LAN) or the Internet. Thus, the portable electronic device 12 can be coupled to any one of the docking stations 14, such as to allow the portable electronic device 12 to access the network 16 via the respective one of the docking stations 14 to which the portable electronic device is coupled.

In the example of FIG. 1, the network 16 includes a plurality N of sets of personality profile information 18. The sets of personality profile information 18 correspond to a personality profile associated with each of the respective docking stations 14. The sets of personality profile information 18 can include data that is associated with the purpose of why a user would couple the portable electronic device 12 to the respective one of the docking stations 14. As an example, the purpose could be associated with the physical location of the docking station 14 in the network system 10. Thus, upon the user coupling the portable electronic device 12 to the respective docking station 14, the docking station 14 can be configured to allow the portable electronic device 12 to access the network 16 to receive a set of personality profile information 18 that corresponds to the respective docking station 14. The personality profile information 18 can thus be displayed on the portable electronic device 12.

The manner in which the sets of personality profile information 18 are associated with the docking stations 14 can be based on an identifier in the docking stations 14, such as stored in a memory or based on a unique network identifier of each respective docking station 14. As an example, one of the docking stations 14 can be located in the kitchen of the users home. Therefore, the user can couple the portable electronic device 12 to that docking station 14 in the kitchen to access the respective personality profile information 18 from the network 16 based on the identifier to read recipes via the portable electronic device 12. As another example, another one of the docking stations 14 can be located in the office of the user's home. Therefore, the user can couple the portable electronic device 12 to that docking station 14 in the office to access the respective personality profile information 18 from the network 16 based on the identifier to receive information or software associated with finances and/or the users employment via the portable electronic device 12.

As described above, the network 16 can be the Internet, such that the personality profile information 18 accessed from the network 16 can be provided as a website from the Internet. Thus, the identifier in each of the docking stations 14 can include a uniform resource locator (URL) corresponding to the website that is accessed from the Internet. Alternatively, the identifier can be a unique identifier associated with each of the respective docking stations 14, such that the Internet can be queried for the personality profile information 18 based on the unique identifier. Therefore, in the above example, the portable electronic device 12 can retrieve one or more websites that include the recipes from the network 16 via the docking station 14 that is located in the kitchen and launch one of the websites from an Internet browser on the portable electronic device 12. Similarly, the portable electronic device 12 can retrieve one or more websites that include tax preparation software or money-management software from the network 16 via the docking station 14 that is located in the office and launch one of the websites from the Internet browser on the portable electronic device 12. The launching of the website can be automatic, or can be in response to an instruction by the user or the portable electronic device 12.

In addition, the personality profile of the docking stations 14 can be edited by the user. For example, the user can access a configuration screen, such as from the portable electronic device 12, to add personality profiles to new or existing docking stations 14, can edit the personality profile of one or more of the docking stations 14, and/or can delete personality profiles of one or more of the docking stations 14. As an example, the configuration screen can be a dedicated configuration screen on the portable electronic device 12, such as accessible anytime or when coupled to a specific docking station 14 for editing the personality profile information 18 of that specific docking station 14. As another example, the configuration screen can be a website that is accessible from the portable electronic device 12 or from any other computer device that can access the Internet.

It is to be understood that the network system 10 in the example of FIG. 1 is not limited to a single portable electronic device 12 working in conjunction with the docking stations 14. Thus, the network system 10 can include a plurality of portable electronic devices 12, which can be the same type or different types of electronic devices. Therefore, each of the portable electronic devices 12 can access the network 16 to receive the information corresponding to the personality profile stored in the memory 51 of the specific docking station 14 in substantially the same manner. Similarly, the network system 10 is not limited to multiple docking stations 14, but could instead include only a single docking station 14 having an editable personality profile. Thus, the network system 10 can be configured in a variety of ways.

Figure 2:
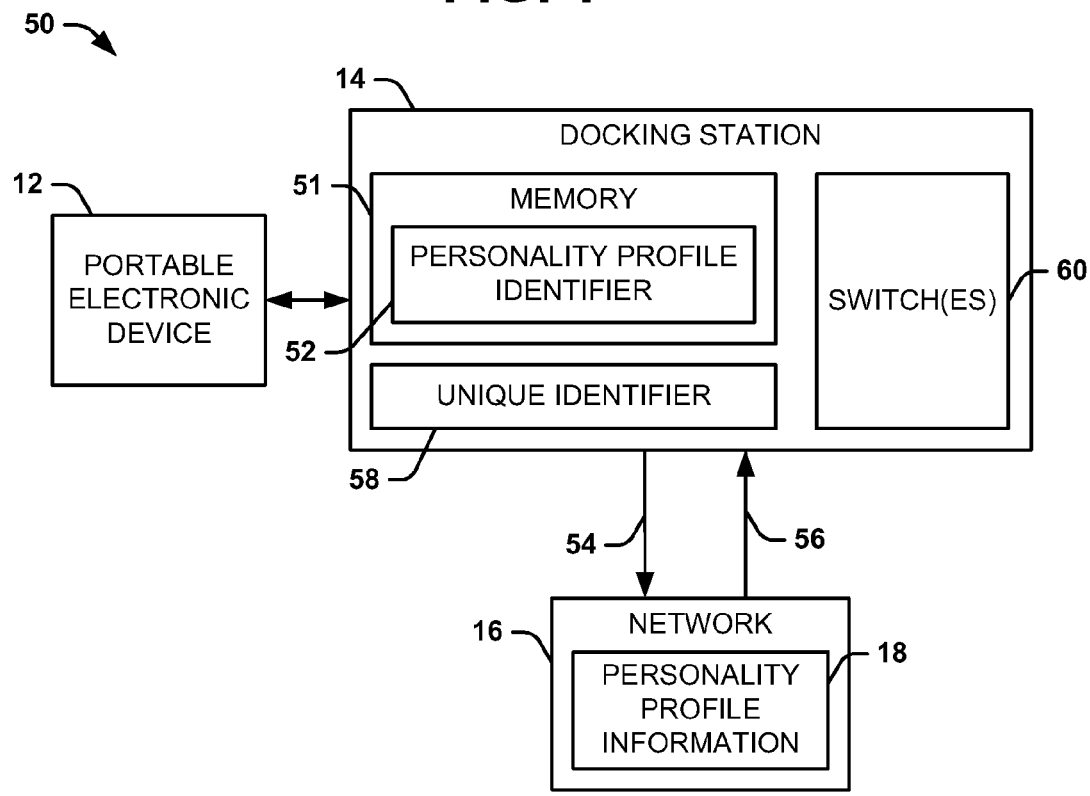
FIG. 2 illustrates another example embodiment of a network system.

FIG. 2 illustrates another example embodiment of a network system 50. As an example, the network system 50 can be a portion of the network system 10 in the example of FIG. 1. Thus, reference is to be made to the example of FIG. 1, and like reference numbers are used in the example of FIG. 2 as those used in the example of FIG. 1.

The network system 50 demonstrates the portable electronic device 12 coupled to a docking station 14. The docking station 14 is demonstrated as including a memory 51 which stores a personality profile identifier 52. The memory 51 in each of the docking stations 14 can be a non-volatile memory, such as a flash memory or an EEPROM. As an example, upon the portable electronic device 12 being coupled to the docking station 14, the portable electronic device 12 is notified of the coupling. In response, the portable electronic device 12 accesses the personality profile identifier 52 from the memory 51. The portable electronic device 12 then accesses the network 16 via the docking station 14, as indicated by the arrow 54, and receives the appropriate personality profile information 18 corresponding to the personality profile identifier 52, as indicated by the arrow 56. The accessing and display of the personality profile information 18 by the portable electronic device 12 can be automatic, such that the portable electronic device 12 accesses the network 16 via the docking station 14 substantially immediately in response to being coupled to the docking station 14 and without being prompted.

As described above in the example of FIG. 1, the network 16 can be the Internet, such that the personality profile information 18 that is accessed by the portable electronic device 12 can be from a website. For example, the URL of the website that is launched by the portable electronic device 12 can be or can be included in the personality profile identifier 52. The portable electronic device 12 can thus launch the website that corresponds to the personality profile identifier 52 on an Internet browser within the portable electronic device 12 upon coupling with the docking station 14.

In addition, in the example of FIG. 2, the docking station 14 includes a unique identifier 58. As an example, the unique identifier 58 can correspond to a network address of the docking station 14 within a local area network (LAN) or the Internet, a serial number of the docking station 14, a Bluetooth address of the docking station 14, or any other type of identifier that can be implemented for recognition of the docking station 14 by the network 16. Upon coupling the portable electronic device 12 with the docking station 14, the portable electronic device 12 can access a web service on the network 16 that includes the sets of personality profile information 18 for the respective the docking stations 14. Thus, as an example, upon accessing the web service, the portable electronic device 12 can use the unique identifier 58 to query the web service to obtain the corresponding personality profile information 18 for the respective docking station 14.

As another example, the unique identifier 58 and the personality profile identifier 52 stored in memory can be used in combination to access the personality profile information 18 from the network 16. Specifically, the portable electronic device 12 can query the web service on the network 16 to access a set of personality profiles corresponding to the docking station 14. The portable electronic device can then select a specific one of the personality profiles to access corresponding personality profile information 18 based on the personality profile identifier 52 stored in the memory 51.

In the example of FIG. 2, the personality profile identifier 52 also includes a plurality of predetermined websites, such that a given one of a plurality of websites corresponding to the personality profile or to multiple personality profiles of the docking station 14 can be accessed based on the selection of one or more switches 60 on the docking station 14. The switch(es) 60 could be hardware switches on the docking station 14, such as dual in-line package (DIP) switches, or could be menu selectable, such as through the configuration screen. As an example, the plurality of websites can be defined in the web service on the network 16 as corresponding to the respective docking station 14. Alternatively, the switch (es) 60 could be used to switch between multiple docking station personality profile identifiers 52 based on the setting of the switch(es) 60.

Figure 3:
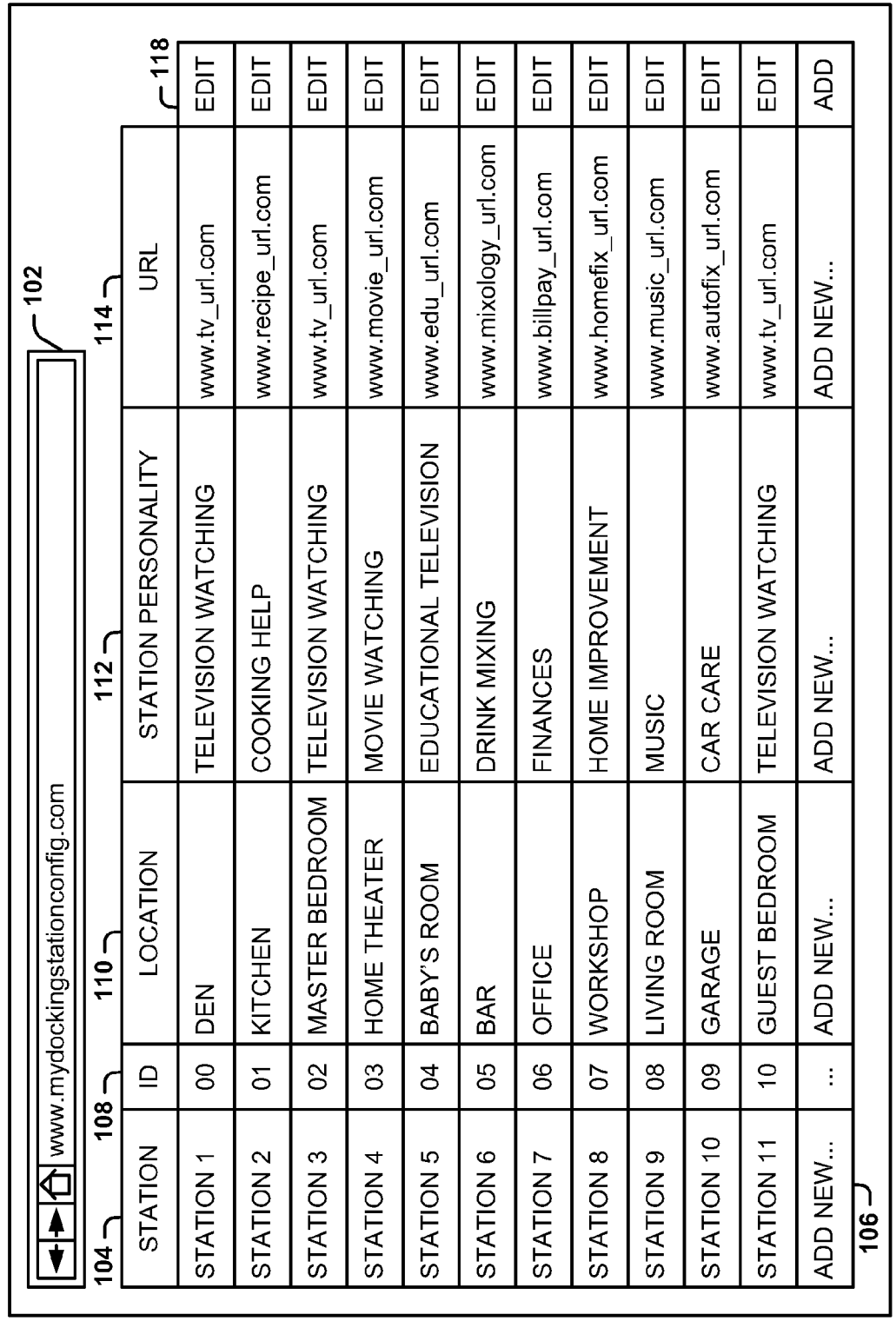
FIG. 3 illustrates an example embodiment of a configuration screen for a network system.

FIG. 3 illustrates an example embodiment of a configuration screen 100 for a network system. The network system can correspond to the network system 10 in the example of FIG. 1. In the example of FIG. 3, the configuration screen 100 is demonstrated as a website, with the URL and control buttons indicated at 102. For example, the configuration screen 100 can correspond to the web service described above in the example of FIG. 2. Thus, the configuration screen 100 can be accessed by the portable electronic device 12 or any other Internet capable computer. As an example, the configuration screen 100 can be password protected, such that a user can log-in to a given service to access the configuration screen 100. However, it is to be understood that the configuration screen 100 could instead be locally accessed, such as in a software module that is locally stored within the portable electronic device 12.

The configuration screen 100 demonstrates eleven separate docking stations 14 in the associated network system 10, as indicated by a first column 104. The configuration screen 100 includes prompts at 106 that allow a user to add additional docking stations 14 and characteristics of the docking stations 14, including a personality profile, to the network system 10. The configuration screen 100 also includes information associated with each of the docking stations 14. Specifically, the configuration screen 100 includes an identification (ID) column 108, such as to identify the docking stations 14 for the user or for the network 16. For example, the ID column 108 could correspond to the unique identifier 58 of the docking stations 14, such as within a given set of docking stations 14 or within the entirety of the Internet. The configuration screen 100 also includes a location column 110 of the docking stations 14 to indicate the physical location of the docking station 14. The configuration screen 100 further includes a docking station personality column 112 corresponding to the actual personality profile of the docking stations 14. In the example of FIG. 3, the personality profile of each of the docking stations 14 is associated with the physical location of the docking station 14. Specifically, the docking station 14 labeled STATION 2 is located in the kitchen, and thus has a personality profile that is associated with helping the user cook. Similarly, the docking station 14 labeled STATION 6 is located in the bar, and thus has a personality profile that is associated with helping the user mix drinks.

The characteristics of the personality profile for the docking stations 14 are demonstrated in the URL column 114. Specifically, the user can enter a website URL for each of the docking stations 14 corresponding to the personality profile of the respective docking stations 14. Thus, in the example of FIG. 3, the user has entered a website (www.recipe url.com) for STATION 2 that can have a list of recipes for cooking food, and a separate website (www.mixology url.com) for STATION 6 that can have a list of how to make mixed drinks. In addition or alternatively, the user can enter keywords associated with the personality profile of the docking stations 14. Therefore, in the example of FIG. 3, the user has entered a set of keywords ("recipe", "food", and "cook") for STATION 2 that are associated with cooking, and a separate set of keywords ("bartender" and "drink") for STATION 6 associated with mixed drinks.

After the user sets the information on the configuration screen 100, the personality profile identifier 52 can be saved in the memory 51 of the respective docking stations 14. For the example of the configuration screen 100 being a website, the URL that is entered into the URL column 114 can be downloaded to each of the docking stations 14 from the network 16 as the personality profile identifier 52. For the example of the configuration screen 100 being a local software component on the portable electronic device 12, the URL that is entered into the URL column 114 can be saved directly to the memory 51 of a docking station 14 as the personality profile identifier 52 upon the portable electronic device 12 being coupled to the respective docking station 14. For the example of the configuration screen 100 corresponding to a web service on the Internet, the URL that is entered into the URL column 114 can thus be assigned to the ID of the respective docking station 14, as dictated by the ID column 108.

The generation of the personality profiles via the configuration screen 100 and the saving of the personality profile identifiers 52 to the memory 51 of the docking stations 14 can thus allow the user to receive the information corresponding to the personality profiles from the network 16. As an example, upon the user coupling the portable electronic device 12 to STATION 2 in the kitchen, the portable electronic device 12 can launch the website (www.recipe url.com) in a local Internet browser to automatically access a list of recipes to allow the user to cook dinner in the kitchen. The user could then disconnect the portable electronic device 12 from STATION 2, walk into the home bar, and couple the portable electronic device 12 to STATION 6. In response, the portable electronic device 12 can then automatically launch the website (www.mixology url.com) in a local Internet browser to automatically access a list of mixed drinks to allow the user to make a given type of mixed drink properly.

In addition, in the example of FIG. 3, the configuration screen 100 includes tabs 116 that allow the user to edit the data regarding the docking stations 14 and the respective personality profiles. In the example of FIG. 3, the tabs 116 are demonstrated as individual tabs 116 for each docking station 14. However, the configuration screen 100 could instead include a single tab 116, such that the user could access an editing screen that would allow the user to edit the information associated with the docking stations 14 and the respective personality profiles. As another example, the portable electronic device 12 could include a switch, either hardware or software, that allows the user to save a URL corresponding to a website that is currently being browsed by the user as a new personality profile website. For example, the user could simply save the current URL as the personality profile in the memory 51 of the docking station 14 to which the portable electronic device 12 is coupled. Therefore, subsequent coupling of the portable electronic device 12 to the respective docking station 14 can automatically launch the saved website, without having to access the configuration screen 100 to change the website in the URL column 114.

Figure 4:
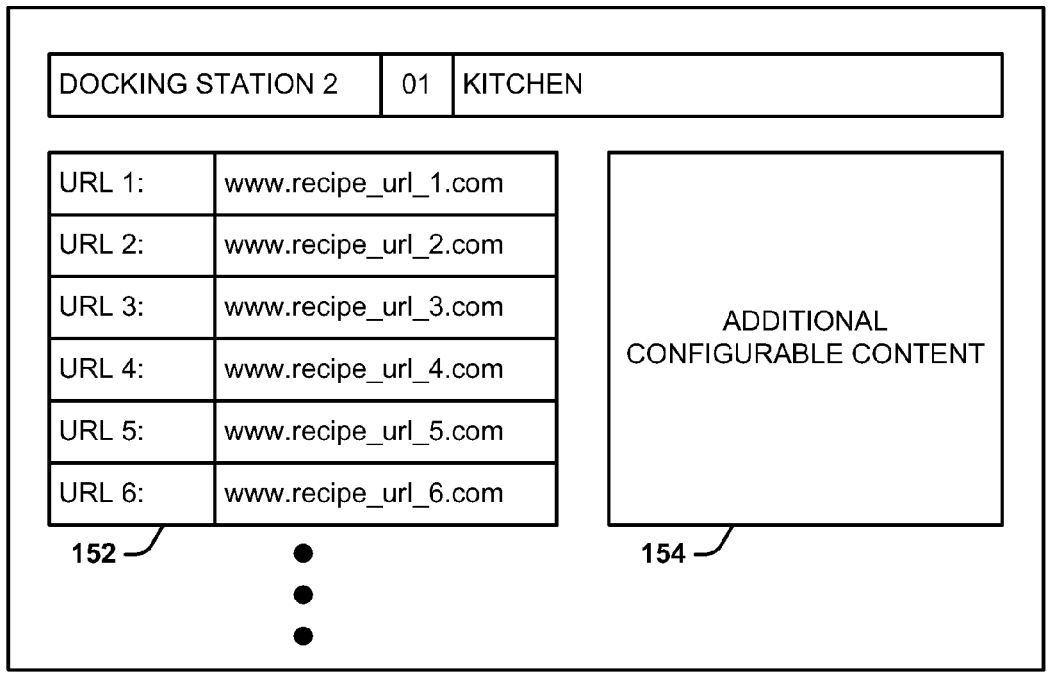
FIG. 4 illustrates an example embodiment of an access screen for a network system.

FIG. 4 illustrates an example embodiment of an access screen 150 for a network system. As one example, the access screen 150 can be accessed from the configuration screen 100, such as from an edit tab 116 associated with one of the docking stations 14. The access screen 150 is a screen that is configured to display multiple websites 152 associated with the personality profile identifier 52. For example, the personality profile identifier 52 can include a couple of keywords that are each associated with the personality profile, such that each of the websites 152 can be generated based on the keywords (e.g., using an Internet search engine or as preprogrammed by the user). As another example, upon the user coupling the portable electronic device 12 to STATION 2 in the kitchen, the portable electronic device 12 can automatically display the access screen 150, such that the user can select which of the websites 152 to launch in the Internet browser of the portable electronic device 12. The selection of the one of the websites 152 can occur from the access screen 150, can be configured from the configuration screen 100, or can be based on selection of the switch(es) 60.

In the example of FIG. 4, each of the websites 152 can be relevant to the keywords, but could have different content. Thus, the list of websites 152 could include additional information, such as a synopsis of the content of each of the websites 152. Therefore, the user can then select one of the websites 152 to launch, such as based on other parameters (e.g., available ingredients in the refrigerator or wanting to cook fish instead of chicken). Furthermore, the access screen 150 can include additional configurable content 154, such as can be configured by the user, that is likewise associated with the personality profile. As an example, the additional configurable content 154 can include articles and/or advertisements that can be requested by the user based on the personality profile of the respective docking station 14. Thus, the additional configurable content 154 can further allow the user to customize the personality profile of the respective docking station 14.

Figure 5:
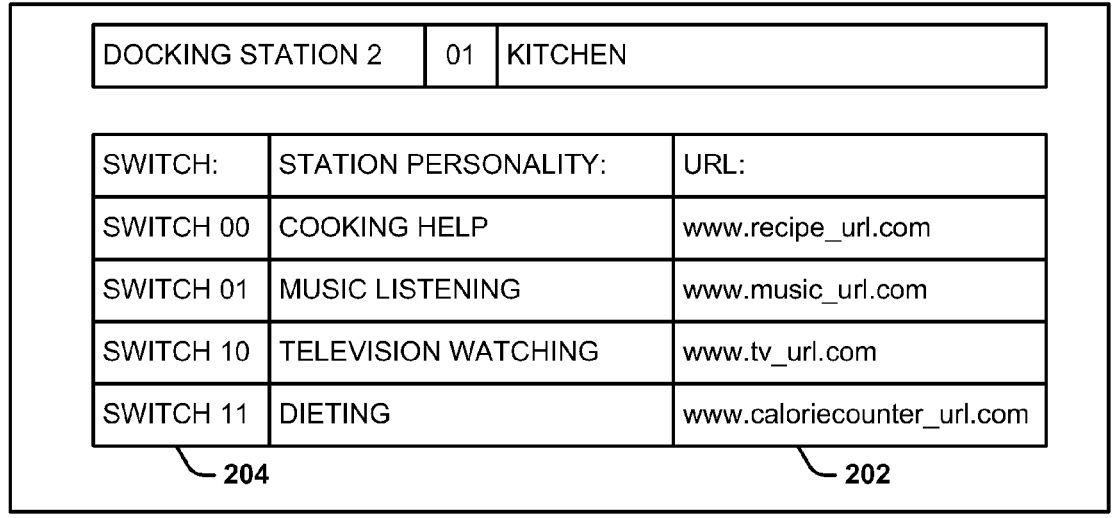
FIG. 5 illustrates another example embodiment of a configuration screen for a network system.

As described above in the example of FIG. 2, the personality profile for a give one of the docking stations 14 is not limited to a single website that is automatically launched by the portable electronic device 12. FIG. 5 illustrates another example embodiment of a configuration screen 200 for a network system. As an example, the configuration screen 200 can correspond to a sub-configuration screen of the configuration screen 100 in the example of FIG. 3, such as in response to activating one of the tabs 116. Specifically, in the example of FIG. 5, the configuration screen 200 is demonstrated as corresponding to the tab 116 associated with STATION 2.

The configuration screen 200 includes a list of URLs 202 that are programmed by the user as corresponding to separate switches, demonstrated at 204. Specifically, STATION 2, located in the user's kitchen, can be programmed with more than one personality profile, such that a given one of the personality profiles can be activated based on which of the switch(es) 60 have been activated. Thus, the user could use STATION 2 for other purposes than reading recipes, but could also listen to music, watch television, or read calorie-counting information. The user could adjust one or more of the switch (es) 60 to switch between the personality profiles, or could select one from the configuration screen 200 itself. In addition, in the example of FIG. 5, the first of the URLs 202 has been designated as a default URL. Thus, the default URL can be the URL that is saved-over by the portable electronic device 12 by a currently browsed website, as described above, or could be a default setting that is not erased, such as in response to a reset of the configuration screen 100.

Figure 6:
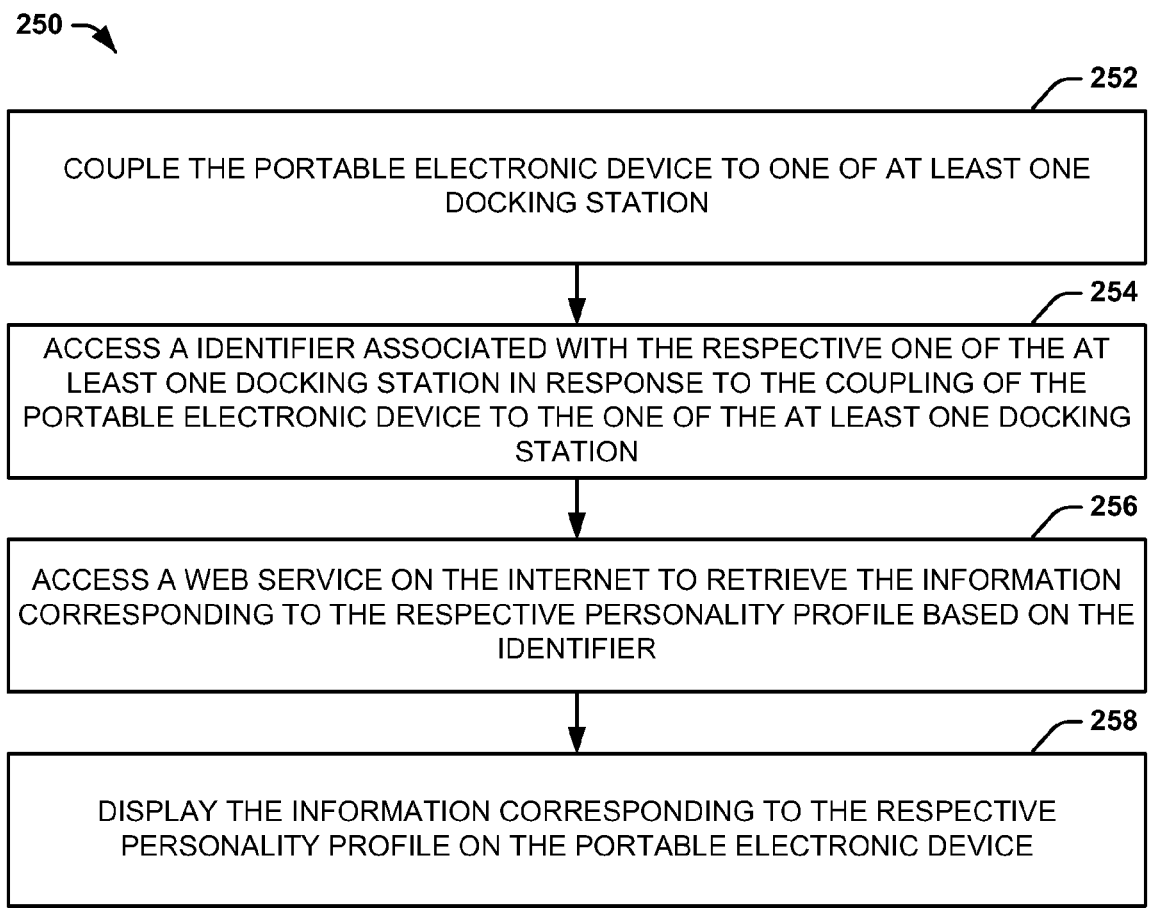
FIG. 6 illustrates an example embodiment of a method for providing information to a user via a portable electronic device.

In view of the foregoing structural and functional features described above, an example methodology will be better appreciated with reference to FIG. 6. While, for purposes of simplicity of explanation, the methodology of FIG. 6 is shown and described as executing serially, it is to be understood and appreciated that the present invention is not limited by the illustrated order, as some embodiments could in other embodiments occur in different orders and/or concurrently from that shown and described herein.

FIG. 6 illustrates an example embodiment of a method 250 for providing information to a user via a portable electronic device. At 252, the portable electronic device is coupled to one of at least one docking station. At 254, an identifier associated with the respective one of the at least one docking station is accessed in response to the coupling of the portable electronic device to the one of at least one docking station. At 256, a web service on the Internet is accessed to retrieve information corresponding to the respective personality profile based on the identifier. At 258, the information retrieved from the Internet and corresponding to the respective personality profile that is retrieved from the network is displayed on the portable electronic device.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A network system comprising at least one docking station to which a portable electronic device is individually couplable, each of the at least one docking station being configured to allow the portable electronic device to access a network to receive information corresponding to a personality profile associated with the respective one of the at least one docking station upon the portable electronic device being coupled to the respective one of the at least one docking station.

2. The system of claim 1, wherein the portable electronic device is configured to query the network to receive the information corresponding to the personality profile associated with the respective one of the at least one docking station based on a unique identifier associated with the respective one of the at least one docking station.

3. The system of claim 1, wherein each of the at least one docking station comprises a memory that is configured to store a website uniform resource locator (URL) associated with the information corresponding to the respective personality profile, wherein the information corresponding to the respective personality profile is received by and displayed on the portable electronic device via the website URL accessed from the Internet.

4. The system of claim 3, wherein the portable electronic device is configured to save a currently browsed URL that is accessed via an Internet browser associated with the portable electronic device as a new website URL associated with the information corresponding to the respective personality profile in the memory.

5. The system of claim 1, wherein each of the at least one docking station comprises at least one switch configured to be setable between different states associated with one or more personality profiles.

6. The system of claim 1, wherein the portable electronic device is further configured to access a configuration screen configured to allow a user to at least one of add, edit, and delete respective personality profiles associated with the at least one docking station.

7. The system of claim 6, wherein the configuration screen is accessed by the user via the Internet.

8. The system of claim 1, wherein a plurality of portable electronic devices are individually couplable to each of the at least one docking station, each of the at least one docking station being configured to allow a respective one of the plurality of portable electronic devices to access the network to receive the information corresponding to the respective personality profile upon a respective one of the plurality of portable electronic devices being coupled to the respective one of the at least one docking station.

9. A method for providing information to a user via a portable electronic device, the method comprising:
coupling the portable electronic device to one of at least one docking station;
accessing an identifier associated with the respective one of the at least one docking station in response to the coupling of the portable electronic device to the one of at least one docking station;
accessing a web service on the Internet to retrieve information corresponding to a respective personality profile based on the identifier; and
displaying the information corresponding to the respective personality profile that is retrieved from the network on the portable electronic device.

10. The method of claim 9, wherein accessing the web service comprises:
accessing the web service via an Internet browser on the portable electronic device; and
querying the web service for information corresponding to the respective personality profile associated with the respective one of the at least one docking station based on the identifier.

11. The method of claim 10, wherein querying the web service comprises querying the web service for a website uniform resource locator (URL) associated with the information corresponding to the respective personality profile that has been assigned to the identifier by the user.

12. The method of claim 9, further comprising at least one of adding personality profiles, editing personality profiles, deleting personality profiles, and customizing personality profiles associated with at least one of the at least one docking station via a configuration screen in the web service.

13. A docking station to which each of at least one portable electronic device are individually couplable, the docking station comprising a memory that is configured to store at least one website uniform resource locator (URL) associated with information corresponding to the respective personality profile associated with the docking station, the docking station being configured to allow the at least one portable electronic device to automatically access at least one website associated with the respective at least one website URL from the Internet to receive the information corresponding to the respective personality profile upon the respective one of the at least one portable electronic device being coupled to the docking station.

14. The system of claim 13, wherein at least one of the at least one portable electronic device is further configured to access a configuration screen configured to allow the user to at least one of add, edit, and delete at least one personality profile associated with the docking station.

15. The system of claim 13, wherein the docking station comprises at least one switch configured to be setable between different states associated with one or more personality profiles.

* * * * *